(12) United States Patent
Bhatoolaul et al.

(10) Patent No.: US 7,197,342 B2
(45) Date of Patent: Mar. 27, 2007

(54) RADIO TELECOMMUNICATIONS NETWORK, USER EQUIPMENT AND METHOD OF OPERATION

(75) Inventors: David Lahiri Bhatoolaul, Wiltshire (GB); Qiang Cao, Wiltshire (GB); Patrick Georges Venceslas Charriere, Gloucestershire (GB); Seau Sian Lim, Wiltshire (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/266,784

(22) Filed: Nov. 4, 2005

(65) Prior Publication Data

US 2006/0063512 A1 Mar. 23, 2006

Related U.S. Application Data

(62) Division of application No. 10/008,124, filed on Nov. 5, 2001.

(30) Foreign Application Priority Data

Nov. 13, 2000 (GB) .................................. 0027688

(51) Int. Cl.
*H04M 1/00* (2006.01)
(52) U.S. Cl. ................... 455/574; 455/343.2; 455/419; 455/412.2; 455/9; 455/343.5; 455/343.4; 455/573
(58) Field of Classification Search ................ 455/524, 455/343.1, 419, 412, 523, 311, 304.1, 343.4
See application file for complete search history.

(56) References Cited

U.S. PATENT DOCUMENTS

| 5,799,069 | A | * | 8/1998 | Weston et al. ........... 379/93.33 |
| 5,901,361 | A | | 5/1999 | Luong ........................ 455/517 |
| 5,933,478 | A | * | 8/1999 | Ozaki et al. ............. 379/93.24 |
| 6,349,204 | B1 | * | 2/2002 | Goetz et al. ................ 455/419 |
| 6,366,792 | B1 | * | 4/2002 | Katsuki ...................... 455/572 |

FOREIGN PATENT DOCUMENTS

GB 2337423 A 11/1999

* cited by examiner

*Primary Examiner*—Joseph Feild
*Assistant Examiner*—David Nguyen

(57) ABSTRACT

Battery operated user equipment is disclosed for use in a radio telecommunications network, including means for monitoring the state of charge of the battery and means for communicating state of charge data to a base station during call set up.

The battery data can be used to inform a caller that, for example, a called user's apparatus has reduced or limited battery capacity and thus that the expected duration of a call is limited.

10 Claims, 2 Drawing Sheets

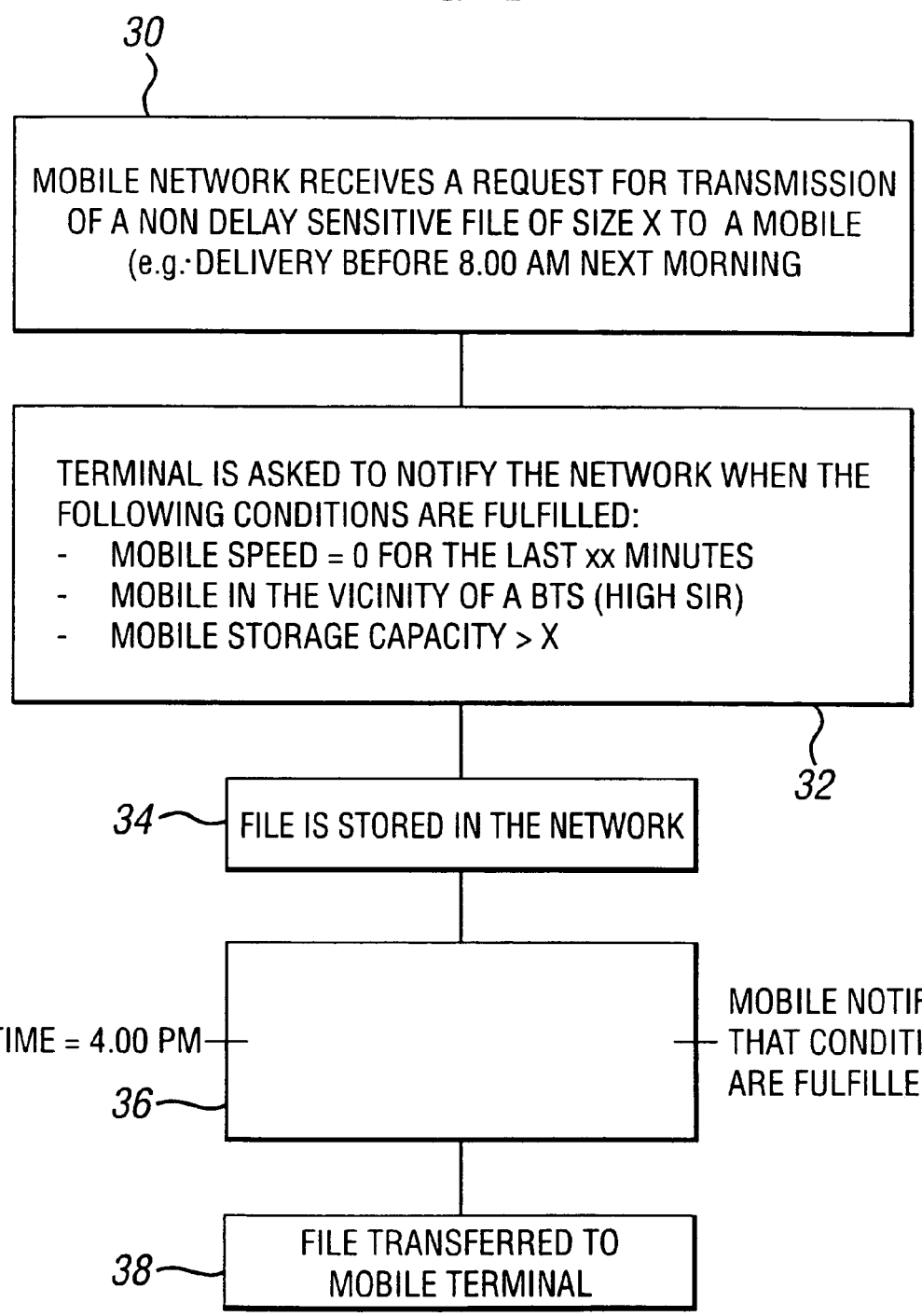

RADIO TELECOMMUNICATIONS NETWORK, USER EQUIPMENT AND METHOD OF OPERATION

CROSS REFERENCE TO RELATED APPLICATION

This is a divisional of application Ser. No. 10/008,124 filed on Nov. 5, 2001.

This application claims priority of Great Britain Application No. GB0027688.1 filed on Nov. 13, 2000.

BACKGROUND OF THE INVENTION

1. Field of the Invention

This invention relates to a radio telecommunications network, to user equipment for the network and to a method and program for operating the equipment and the network.

2. Description of the Related Art

The background to invention will be explained against the applicants' realisation that even in second generation networks all known planned services are near real time.

SUMMARY OF THE INVENTION

Against this background there is provided user equipment for use in a radio telecommunications network, including: a data store; a processor arranged to write to the store, data received from a base station in the network; to monitor the available capacity of the data store; and to communicate available capacity data to a base station.

A preferred embodiment includes a data store and means for configuring the equipment to receive files automatically and store them in the data store, or to retrieve files from the data store and transmit them, without activating any sounder or vibrator for alerting the user. A very significant advantage of such an arrangement is that files for which immediate delivery is not important, can be sent at times when activity on the network is low, e.g. at night.

In the preferred example, in order that the user shall not be disturbed by unwanted conventional calls e.g. at night, user input means is preferably provided selectively barring set up of calls which require alerting a user.

The preferred equipment may include a battery capacity monitor for monitoring the remaining capacity of the battery and for communicating battery capacity data to the base station.

The equipment preferably includes means for estimating which one of a plurality of available physical channels would best conserve battery charge, and for signalling the identity of that channel to the base station during call set up.

The invention extends to a radio telecommunications network including battery operated user equipment, which equipment includes means for monitoring the state of charge of the battery; a data store; means for configuring the equipment to receive files automatically and store them in the data store, or to retrieve files from the data store and transmit them; and means for monitoring the available data storage capacity of the data store, the network including: means for estimating whether the state of charge of the battery and/or the available data storage capacity is/are sufficient to allow reception or transmission of each file, with or without a predetermined reserve, and for denying reception or transmission if the state of charge or the available data storage is insufficient.

The invention also extends to a method of operating user equipment in a mobile communication network, said equipment including a data store, comprising monitoring the available capacity of the store and communicating available capacity data to the radio network.

The invention further extends to a computer program for carrying out all the steps of the method

BRIEF DESCRIPTION OF THE DRAWINGS

Embodiments of the invention will now be described, by way of example, with reference to the accompanying drawing, in which:

FIG. 2 is a block diagram illustrating a method of operation of a network and user equipment embodying the invention.

DETAILED DESCRIPTION

Figure 1:
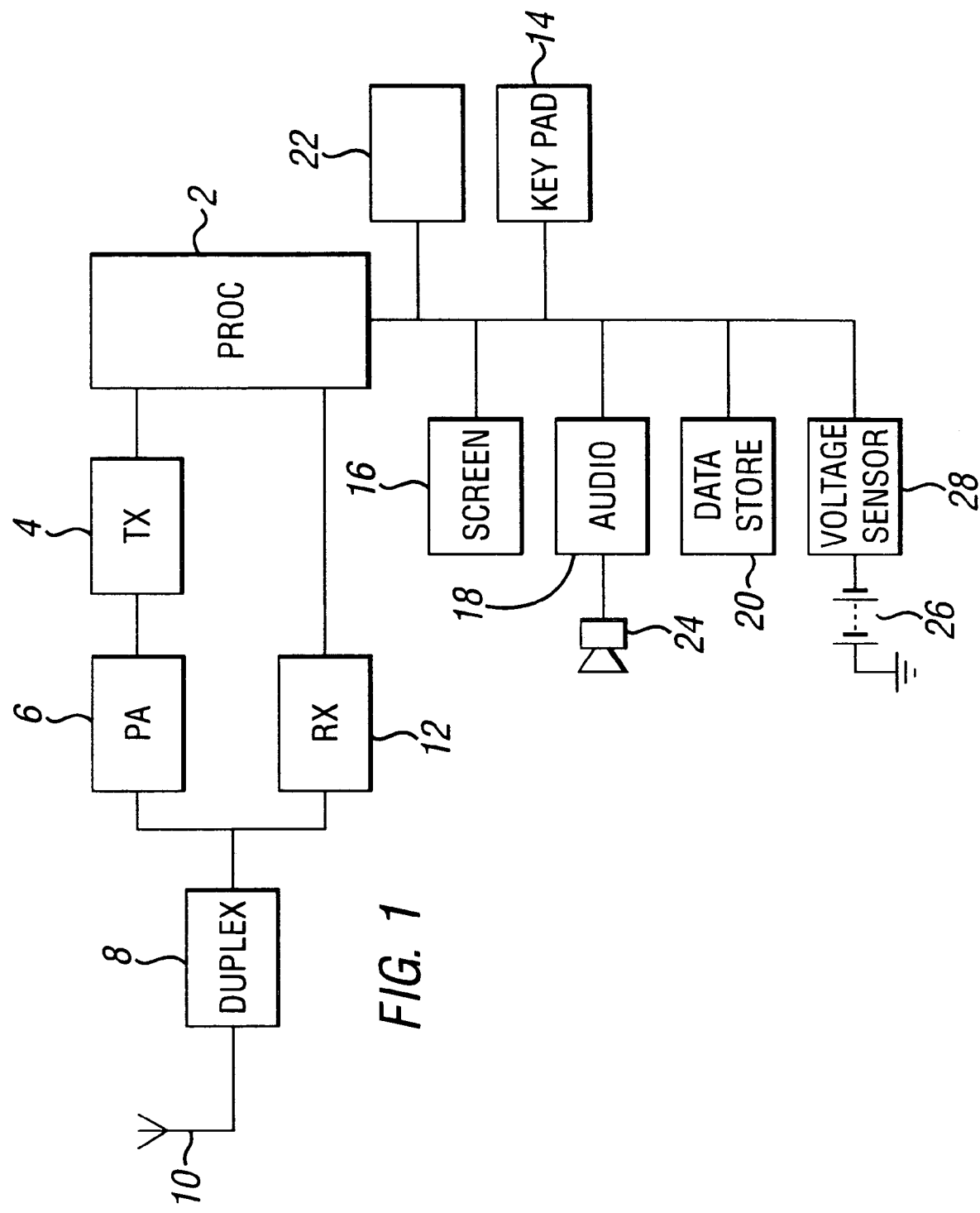
FIG. 1 is a block diagram of user equipment embodying the invention.

Referring to the drawing, a processor 2 sends user data and signalling information for transmission by a transmitter 4 on both user channels and common channels. The transmitter 4 sends modulated radio frequency signals to a power amplifier 6 and via a duplexer 8 to an antenna 10. Common channel and user channel radio signals received by the antenna 10 are sent via the duplexer to a receiver 12, where data signals are recovered and sent to the processor 2.

Data can be input to the processor via a keypad 14, e.g. for initiating a call.

Information can be displayed by the processor on a display screen 16, e.g. that the unit is in communication with a network, remaining battery capacity, a directory number input from the keypad etc.

The user equipment is provided with a writable data store 20 e.g. in the form of a flash memory. A program store 22 contains an interface to enable the processor to read and write the data store 20 and to monitor its spare capacity.

Conventionally, when an attempt is made over a common channel to set up a call, signals are sent from the processor to audio circuits 18 which drive transducer 24 to generate an audible tone. In the present user equipment, to effect wireless off line transfer (WOLFT), special signalling on the common channel can set up a call without activating the transducer 24 although visible (silent) signals may be displayed on the screen 16. The call set up information can specify that data (a file e.g. e-mail) to be sent in a user channel on the downlink is to be stored in the data store 20. The set up information may specify the file size. Software stored in the program store 22 is arranged to determine whether or not the available capacity of the data store is sufficient to contain the file and to refuse or discontinue the call if it is not. In an alternative, during call set up, available capacity of the data store 20 is transmitted on the uplink and a decision as to whether or not to send the file being made in the network e.g. in the radio resource control (RRC) layer. In general, there is sufficient spare capacity on the common channels to accommodate the extra signalling.

The user equipment is powered by a battery 26. Before transmitting a long file to the user equipment, it is relevant to know whether the battery has sufficient life available to enable the full file to be received. To this end a voltage sensor 28 communicates with the processor 2. From the battery voltage, the processor 22 performs a calculation based on an estimate of the power usage during transfer of the file, and on the size of the file and data transfer rate, to determine whether there is sufficient battery life available to receive the full file. In an alternative, it is determined whether there would be a predetermined minimum life left after receiving the file. If either condition is not fulfilled, the call is refused or terminated. In an alternative, data indicating the battery voltage or battery life is transmitted on the common channel during call set up and the decision is made by the network in the RRC layer.

If more than one user data channel is available, the processor is arranged to assess use of that which would make least drain on the battery, e.g. by requiring least power and/or giving greatest data transfer rate, and to select that channel.

The software stored in the program store 22 is responsive to user input from the keypad 14 to disable the transducer, audio circuits 18, or bar set up of calls requiring operation of the transducer 24, leaving the user equipment responsive to common channel signalling to set up a call in which the transducer is not sounded and in which a data file, e.g. e-mail, can be silently downloaded to the data store 20.

The network may be set to provide file transfer service, e.g. e-mail to be delivered by 8:00 the next day at times which are convenient to it e.g.:

a) The network load is very low.

b) Assuming sufficient temporal variation in the traffic load across the air-interface, there will be times (e.g. at night) when there is spare air-interface capacity (spare time-slots for 2G TDMA systems and spare power for 3G CDMA systems). This spare capacity could be particularly efficiently used by WOLFT on the DL.

c) The radio channel propagation characteristics are extremely favourable. An example of when this could occur are when the mobile is very close to the base station or when the mobile is no longer moving at high speed. With statistics regarding the users habit the network or wireless equipment may even be able to predict when the radio conditions may be most favourable for UL or DL WOLFT.

d) The mobile has the capacity to receive/transmit the complete message. An example of exclusion would be when the mobile has insufficient battery or storage capabilities to enable the UL or DL WOLFT to be completed.

e) The user equipment user places the equipment into a "WOLFT enabled mode". This could occur when the mobile user wishes to go to sleep and places the mobile into a "Stand by do not disturb Sleep mode".

f) To prevent overload of the storage buffers of the network.

Referring to FIG. 2, the network sends a request to transmit a non delay sensitive file of size X (e.g. for delivery before 8.00 am the next day). The request is received by the user equipment in block 30. The user equipment is asked to notify the network when one or more of the following conditions are met: 1) the user equipment has not notified the radio network of a location (e.g. cell) update for a predetermined time which may be specified in the request; 2) the radio link quality between the user equipment and the BTS is very good (e.g. the user equipment is very close to the BTS and the traffic load 15 low and 3) the storage capacity of the user equipment is greater than X.

The invention claimed is:

1. User equipment for use in a radio telecommunications network, the user equipment comprising a data store and a processor;

the processor being arranged to receive information specifying the size of a specific data file it is proposed for the user equipment to receive; the processor, following receipt of said information specifying the size of said specific data file, being arranged to use said information to determine whether or not there is sufficient battery charge available to receive the full specific data file, and if the battery charge is determined as not sufficient, the user equipment being arranged to refuse to receive the specific data file for which it has already received said information.

2. User equipment according to claim 1, in which the information specifying the size of the data file is part of call set-up information received from a base station, and upon determination of that battery charge is not sufficient, the call is discontinued.

3. User equipment according to claim 1, in which upon determination that there is sufficient battery charge, the processor is arranged to write to the data store the data file received from a base station of the network.

4. User equipment according to claim 1, in which in said determination of whether there is sufficient battery charge, said information is used together with an estimate of power usage during reception of the file.

5. User equipment according to claim 4, in which data transfer rate is considered in the determination.

6. A method of operating user equipment in a radio telecommunications network, the user equipment comprising a data store and a processor;

the method comprising the steps of:

monitoring the battery charge;

the processor receiving information specifying the size of a specific data file it is proposed for the user equipment to receive; and following receipt by the processor of said information specifying the size of said specific data file, the processor determining whether or not there is sufficient battery charge available to receive the full specific data file, and if determined not sufficient, the user equipment refuses to receive the specific data file for which it has already received said information.

7. A method according to claim 6, in which said information received constitutes call set-up information and is received together with other call set-up information, and upon the battery charge being determined not sufficient, the call is discontinued.

8. A method according to claim 6, in which upon determination that the battery charge is sufficient, the processor writes to the data store the data file received from a base station of the network.

9. A method according to claim 6, in which in said determination of whether there is sufficient battery charge said information is used together with an estimate of power usage during reception of the file.

10. A method according to claim 9, in which data transfer rate is considered in the determination.

* * * * *